US011659028B2

United States Patent
Kang et al.

(10) Patent No.: US 11,659,028 B2
(45) Date of Patent: May 23, 2023

(54) DATA OFFLOADING RATE DETERMINATION USING MEAN FIELD GAMES

(71) Applicant: Toyota Motor Engineering & Manufacturing North America, Inc., Plano, TX (US)

(72) Inventors: Yuhan Kang, Houston, TX (US); Haoxin Wang, Charlotte, NC (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/481,430

(22) Filed: Sep. 22, 2021

(65) Prior Publication Data

US 2023/0090549 A1 Mar. 23, 2023

(51) Int. Cl.
*G06F 15/16* (2006.01)
*H04L 67/1023* (2022.01)
*H04W 4/44* (2018.01)
*H04W 76/10* (2018.01)
*H04L 67/1008* (2022.01)

(52) U.S. Cl.
CPC ...... *H04L 67/1023* (2013.01); *H04L 67/1008* (2013.01); *H04W 4/44* (2018.02); *H04W 76/10* (2018.02)

(58) Field of Classification Search
CPC .. H04L 67/1023; H04L 67/1008; H04W 4/44; H04W 76/10

USPC .......................................... 709/219
See application file for complete search history.

(56) References Cited

U.S. PATENT DOCUMENTS

| | | | | |
|---|---|---|---|---|
| 6,990,662 B2* | 1/2006 | Messer | ............... | G06F 9/547 709/204 |
| 8,495,129 B2* | 7/2013 | Wolman | ........... | H04W 52/0245 709/224 |
| 8,745,309 B2* | 6/2014 | Jung | .................... | G11C 16/349 713/100 |
| 9,239,740 B2* | 1/2016 | Zhao | ..................... | G06F 9/5044 |
| 9,762,060 B2* | 9/2017 | Kalsi | ........................ | H02J 3/16 |
| 9,853,744 B2* | 12/2017 | Damus | ................. | H04B 13/02 |
| 9,854,032 B2* | 12/2017 | Liu | ....................... | H04L 67/104 |

(Continued)

OTHER PUBLICATIONS

Zheng, R. et al., "Optimal Computation Offloading with a Shared MEC Center: a Mean Field Game Approach", 2019 IEEE Globecom Workshops (GC Wkshps) 2019, pp. 1-6.

(Continued)

*Primary Examiner* — Alicia Baturay
(74) *Attorney, Agent, or Firm* — Christopher G. Darrow; Darrow Mustafa PC

(57) ABSTRACT

Systems, methods, and other embodiments described herein relate to determining an optimal data offloading rate for one or more connected mobile devices. In one embodiment, a method includes receiving mobile device transmission information and receiving edge server resource information. The method includes determining an offloading rate for a mobile device to an edge server based on the mobile device transmission information, the edge server resource information, and a mean-field game algorithm. The method includes outputting the offloading rate to the mobile device.

20 Claims, 4 Drawing Sheets

(56) References Cited

U.S. PATENT DOCUMENTS

| | | | |
|---|---|---|---|
| 9,939,878 B2* | 4/2018 | Wolman | G06F 1/3234 |
| 10,044,798 B2* | 8/2018 | Liu | H04L 67/125 |
| 10,110,323 B2* | 10/2018 | Damus | H04B 13/02 |
| 10,257,267 B2* | 4/2019 | Marinelli | H04L 67/60 |
| 10,380,889 B2* | 8/2019 | Jain | G06V 20/56 |
| 10,440,096 B2 | 10/2019 | Sabella et al. | |
| 10,498,141 B2* | 12/2019 | Kalsi | H02J 3/008 |
| 10,539,966 B2* | 1/2020 | Hasegawa | G05D 1/0276 |
| 10,547,667 B1* | 1/2020 | Neill | G06F 11/3006 |
| 10,887,180 B2* | 1/2021 | Turner | H04L 63/0823 |
| 11,096,036 B2* | 8/2021 | Poornachandran | H04L 45/302 |
| 11,159,958 B1* | 10/2021 | Hatamian | H04W 16/28 |
| 11,172,542 B1* | 11/2021 | Kalkunte | H04W 36/0083 |
| 11,191,013 B1* | 11/2021 | Kalkunte | H04W 64/003 |
| 11,252,723 B1* | 2/2022 | Lu | H04L 41/16 |
| 11,265,733 B1* | 3/2022 | Hatamian | H04W 16/28 |
| 11,292,489 B2* | 4/2022 | Liu | B60W 40/08 |
| 11,297,161 B1* | 4/2022 | Liu | G06F 9/5038 |
| 11,310,864 B2* | 4/2022 | Wang | H04L 12/1836 |
| 2018/0220283 A1* | 8/2018 | Condeixa | H04L 67/12 |
| 2019/0289445 A1* | 9/2019 | Wang | H04W 8/22 |
| 2019/0350046 A1* | 11/2019 | Wang | H04L 45/028 |
| 2020/0279136 A1* | 9/2020 | Subramanian | G06K 9/6257 |
| 2021/0385294 A1* | 12/2021 | Bielby | H04L 67/12 |
| 2022/0038375 A1* | 2/2022 | Bielby | H04L 47/12 |

OTHER PUBLICATIONS

Wang, J. et al., "Edge Cloud Offloading Algorithms: Issues, Methods, and Perspectives," ACM Computing Surveys, vol. 52, No. 1, Article 2 (Feb. 2019), 23 pages.

Qin, Z. et al., "User-Edge Collaborative Resource Allocation and Offloading Strategy in Edge Computing," Wireless Communications and Mobile Computing, vol. 2020, Article ID 8867157, (Jun. 12, 2020) 12 pages.

Raza, S. et al., "An Efficient Task Offloading Scheme in Vehicular Edge Computing," Journal of Cloud Computing: Advances, Systems and Applications (2020) 9:28, pp. 1-14.

Banez, R.A., et al., "Mean-Field-Type Game-Based Computation Offloading in Multi-Access Edge Computing Networks," IEEE Transactions on Wireless Communications, vol. 19, No. 12 (Dec. 2020) pp. 8366-8381.

Zhang, W. et al., "Energy-optimal mobile cloud computing under stochastic wireless channel", IEEE Transactions on Wireless Communications, vol. 12, No. 9 (2013) pp. 4569-4581.

Wang, C. et al., "Computation offloading and resource allocation in wireless cellular networks with mobile edge computing," IEEE Transactions on Wireless Communications, vol. 16, No. 8 (2017) pp. 4924-4938.

Chen, M.H. et al., "Joint offloading decision and resource allocation for multi-user multi-task mobile cloud," 2016 IEEE International Conference on Communications (ICC) (2016) pp. 1-6.

\* cited by examiner

DATA OFFLOADING RATE DETERMINATION USING MEAN FIELD GAMES

TECHNICAL FIELD

The subject matter described herein relates, in general, to systems and methods for determining an optimal data offloading rate for one or more connected mobile devices to an edge server.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Connected vehicles may connect to an edge server and offload data to the edge server. However, as the number of connected vehicles connecting to the edge server and attempting to offload data to the edge server increases, it may become increasingly difficult to find an optimal offloading rate for each of the connected vehicles such that the available resources are being distributed to the connected vehicles.

SUMMARY

This section generally summarizes the disclosure and is not a comprehensive explanation of its full scope or all its features.

In one embodiment, a method for determining an optimal data offloading rate for one or more connected mobile devices includes receiving a mobile device transmission information and receiving an edge server resource information. The method includes determining an offloading rate for a mobile device to an edge server based on the mobile device transmission information, the edge server resource information, and a mean-field game algorithm. The method includes outputting the offloading rate to the mobile device.

In another embodiment, a system for determining an optimal data offloading rate for one or more connected mobile devices includes a processor and a memory in communication with the processor. The memory stores a control module including instructions that, when executed by the processor, cause the processor to receive mobile device transmission information and receive edge server resource information. The control module further includes instructions that, when executed by the processor, cause the processor to determine an offloading rate for a mobile device to an edge server based on the mobile device transmission information, the edge server resource information, and a mean-field game algorithm, and output the offloading rate to the mobile device.

In another embodiment, a non-transitory computer-readable medium for determining an optimal data offloading rate for one or more connected mobile devices and including instructions that, when executed by a processor, cause the processor to perform one or more functions, is disclosed. The instructions include instructions to receive mobile device transmission information, receive edge server resource information, determine an offloading rate for a mobile device to an edge server based on the mobile device transmission information, the edge server resource information, and a mean-field game algorithm, and output the offloading rate to the mobile device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
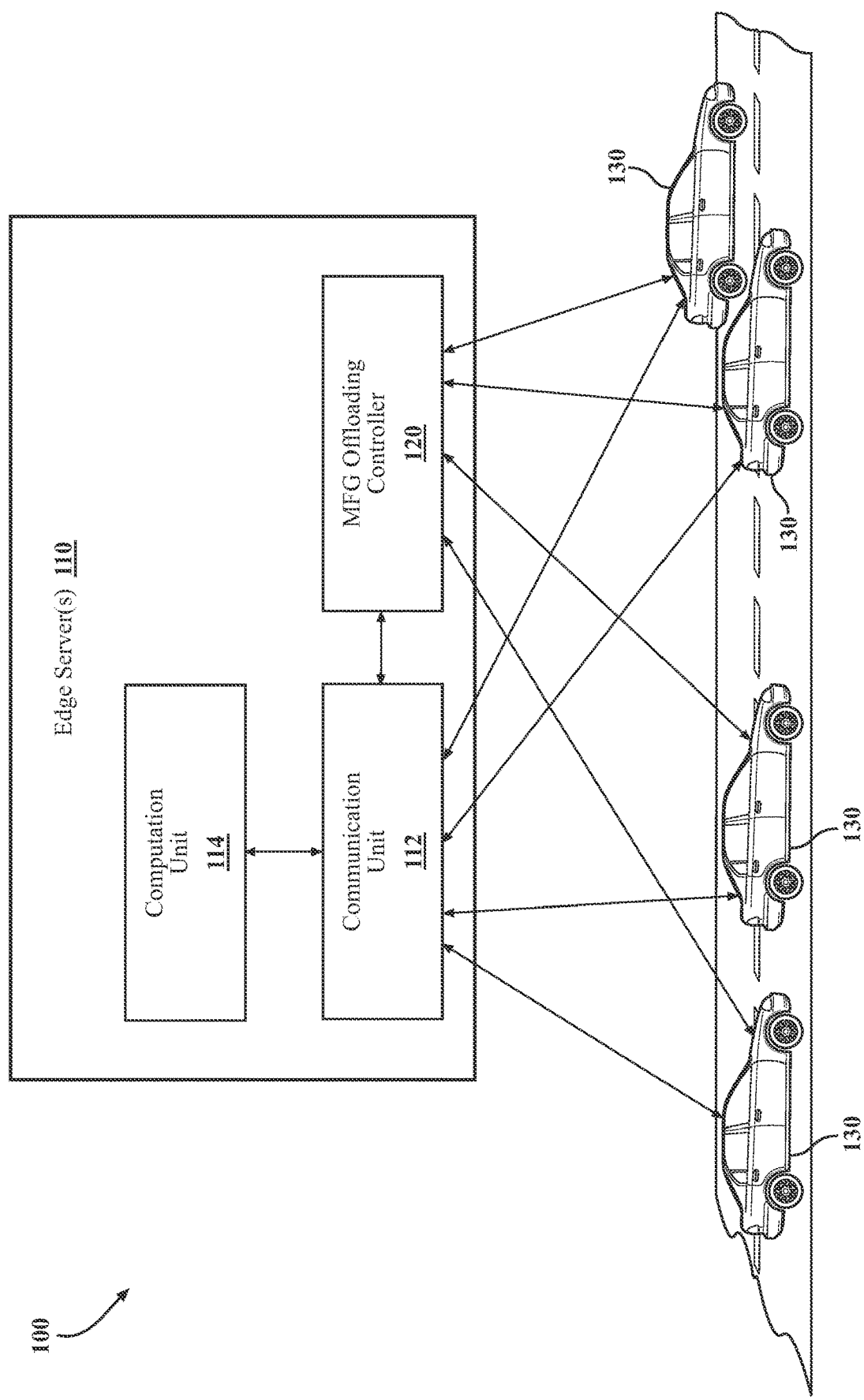
FIG. 1 is an example of a data offloading system.

Systems, methods, and other embodiments associated with determining an optimal data offloading rate for one or more connected mobile devices, are disclosed.

Modern vehicles include various applications to support a vehicle operator and enhance the driving experience. As an example, modern vehicles may include driver assistance systems such as adaptive cruise control, collision avoidance systems, driver drowsiness detection, intelligent speed adaptation, tire pressure monitoring, parking assistance, and lane departure warning systems. In such an example and to provide support to the vehicle operator, the vehicle occupants, and the vehicle, the vehicle may monitor the environment and the physical condition of the vehicle occupants using sensors. The sensors may be vehicle sensors located in the interior and/or exterior of the vehicle. Additionally, the sensors may be external sensors such as roadside sensors. To provide support, the vehicle may collect and process large amounts of data, particularly sensor data. In most cases, the vehicle may not have the storage space and processing capability to store and process the large amounts of data being generated by the sensors. As a solution, the vehicle, which may be a connected vehicle, can offload the data to a nearby edge server which has the storage space to accommodate large amounts of data and the processing capability to process the data. In such a case, the nearby edge server may receive and process the data, then send the results to the vehicle.

The number of vehicles that attempt to connect to a single edge server may be quite large and can lead to issues in terms of the distribution of transmission and/or computation resources of the edge server between the vehicles attempting to offload to the edge server. Previous solutions to determine an optimal offloading rate for each of the vehicles attempting to offload data to the edge server have been very complex and have not been very effective in adequately distributing the limited resources between the vehicles.

Accordingly, in one embodiment, the disclosed approach is a system that determines the optimal offloading data rate for each mobile device attempting to offload data to an edge server using a mean-field game algorithm. As an example, the system may receive information from the mobile device such as a data generation rate, a response time latency, a computation cost, and a transmission cost. The system may receive information from the edge server such as a bandwidth limitation, a channel gain, environment information, and a number of connected mobile devices. The environment information may include the traffic levels such as low traffic areas and high traffic areas. The environment information may include a location such as an intersection, a highway, and an overpass. The system may then apply a mean-field game algorithm to the information from the mobile device as well as the edge server to determine an offloading rate for the mobile device. As described above, a mobile device may be a vehicle. Additionally and/or alternatively, a mobile device may be a device that is capable of being in motion, and is capable of communicating with an edge server, transmitting and receiving data.

There are various advantages of the disclosed approach over previous solutions. Firstly, the disclosed approach enables optimizing the offloading rate for a large number of mobile devices simultaneously while they are connected to the edge server. Secondly, the disclosed approach is capable of handling different types of data offloading application for mobile devices. The disclosed approach may consider data generation rates that are time dependent and/or mobility dependent. A data generation rate that is mobility dependent considers the speed of travel of the mobile device and/or the risks surrounding the mobile device (such as a risk of collision with a proximate vehicle). Thirdly, the disclosed approach is time efficient and the computation time is independent of the number of mobile devices that connect to the edge server. Fourthly, the disclosed approach includes a mean-field game controller that may be located within the edge server's hardware. Fifthly, the disclosed approach can operate efficiently in diverse traffic scenarios such as at an intersection, on a highway, or on a roadside. Different traffic scenarios may significantly impact the wireless transmission quality such as channel capacity, environment signal noise between the mobile devices and the edge server. Sixthly, the disclosed approach can optimize the distribution of all mobile devices' data offloading rate instead of optimizing every mobile device's data offloading individually. Finally, the disclosed approach may include support for handover. In such a case, when a mobile device that still has data to be transmitted and is connected to a first edge server moves out of the coverage area of the first edge server and into the coverage area of a second edge server, the mobile device can seamlessly move from transmitting from the first edge server to the second edge server.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a data offloading system 100 is shown. The data offloading system 100 may include one or more edge servers 110, one or more mobile devices 130, which are shown in FIG. 1 as connected vehicles 130 that can be configured to connect and offload data to the edge server(s) 110, and one or more mean field game (MFG) offloading controllers 120. The MFG offloading controller 120 may be located inside the edge server 110, as shown. Alternatively, the MFG offloading controller 120 may be external to the edge server 110. The MFG offloading controller 120 may be a multi thread MFG offloading controller. A multi-thread MFG offloading controller includes multiple processing threads and may process different data concurrently on different threads. Alternatively, the MFG offloading controller 120 may be a single thread MFG offloading controller, which includes a single processing threads and may process data on the single thread. The edge server 110 may include a communication unit 112 and a computation unit 114 in addition to the MFG offloading controller 120.

As the mobile device 130 travels into the coverage area of an edge server 110, the mobile device 130 may transmit a signal to the MFG offloading controller 120 requesting to connect to the edge server 110. The MFG offloading controller 120 may transmit a signal to the mobile device 130 confirming that a connection between the mobile device 130 and the edge server 110 has been established.

The mobile device 130 may transmit a signal to the edge server 110, more specifically, the communication unit 112, requesting to offload data to the edge server 110. The edge server 110, more specifically, the communication unit 112 may transmit a signal to the mobile device 130, confirming that the mobile device 130 may offload data to the edge server 110.

The MFG offloading controller 120 may request information from the mobile device 130 such as data generation rate, response time latency, and mobile device speed. The MFG offloading controller 120 may request information from the edge server 110, more specifically, the communication unit 112 such as channel gain, bandwidth limitation and the number of mobile devices connected to the edge server 110. Upon receiving information from the mobile device 130 and the edge server 110, the MFG offloading controller 120 may apply a mean-field games algorithm to the information from the mobile device 130 and the edge server 110 to determine the optimal offloading rate. The multi-thread offloading controller 120 may group together information from mobile devices 130 that have similar information such as similar data generation rates, similar response time latency, and/or similar mobile device speeds, and may process the information in a single thread out of the multiple threads, and output single optimal offloading rate.

Upon determining the optimal offloading rate, the MFG offloading controller 120 may transmit the optimal offloading rate to the mobile device 130. The mobile device 130 may then offload data to the edge server at the optimal offloading rate received from the MFG offloading controller. Upon receiving the data, the edge server 110, more specifically, the computation unit 114 may process the data and transmit the results to the mobile device 130.

Figure 2:
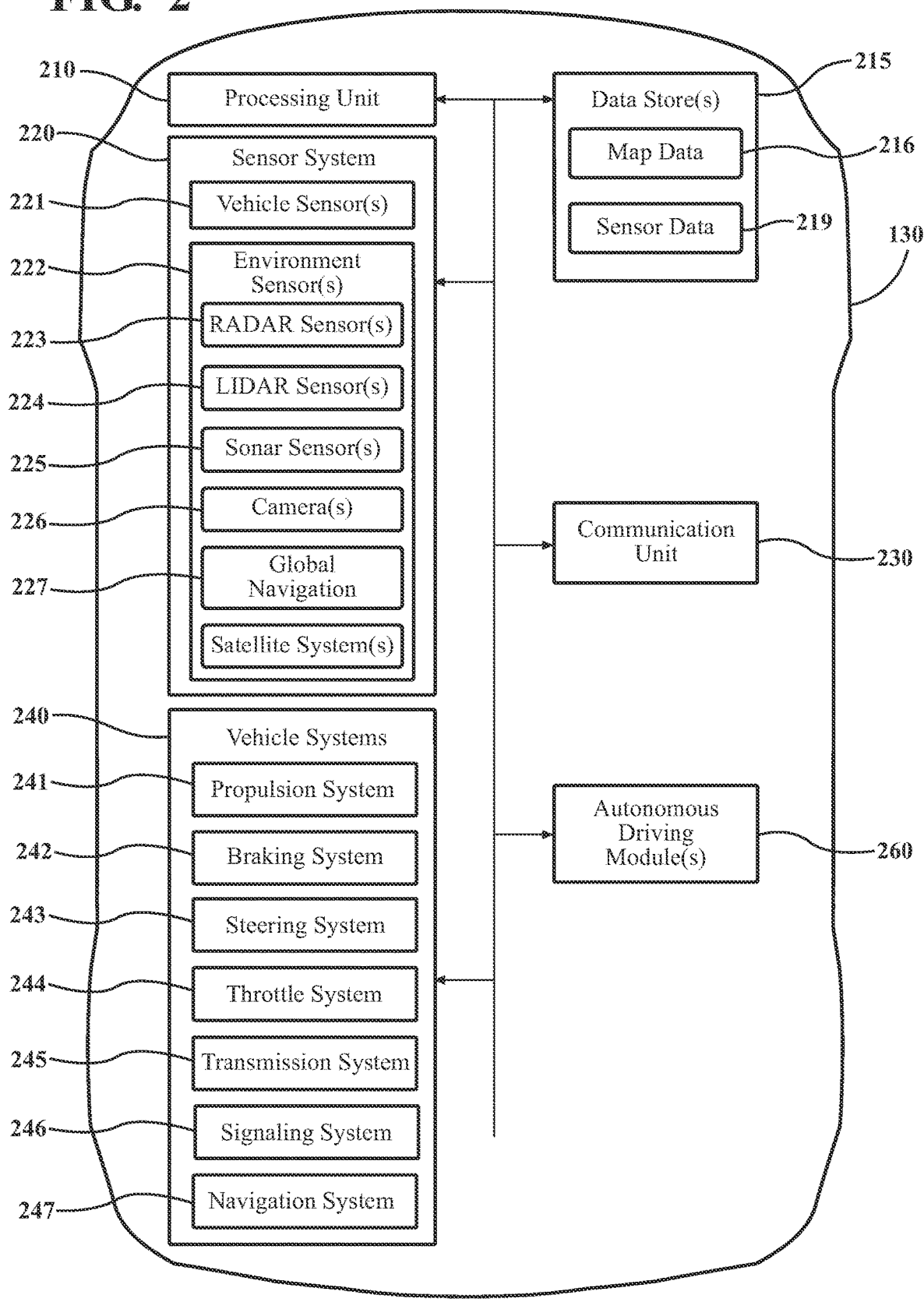
FIG. 2 is a block diagram of a mobile device, illustrating a connected vehicle.

Referring to FIG. 2, a block diagram of a mobile device 130, illustrated here as a connected vehicle 130. The vehicle 130 includes various elements. It will be understood that in various embodiments, it may not be necessary for the vehicle 130 to have all of the elements shown in FIG. 2. The vehicle 130 can have any combination of the various elements shown in FIG. 2. Further, the vehicle 130 can have additional elements to those shown in FIG. 2. In some arrangements, the vehicle 130 may be implemented without one or more of the elements shown in FIG. 2. While the various elements are shown as being located within the vehicle 130 in FIG. 2, it will be understood that one or more of these elements can be located external to the vehicle 130. Further, the elements shown may be physically separated by large distances. For example, as discussed, one or more components of the disclosed system can be implemented within a vehicle while further components of the system may be implemented within a cloud-computing environment.

In one or more embodiments, the connected vehicle 130 may be an autonomous vehicle. As used herein, "autonomous vehicle" refers to a vehicle that operates in an autonomous mode. "Autonomous mode" refers to navigating and/or maneuvering the vehicle 130 along a travel route using one or more computing systems to control the vehicle 130 with minimal or no input from a human driver. In one or more embodiments, the connected vehicle 130 may be configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 130 along a travel route. In one or more embodiments, the connected vehicle 130 can be a conventional vehicle that is configured to operate in only a manual mode. "Manual mode" means that all of or a majority of the navigation and/or maneuvering of the vehicle is performed according to inputs received from a user (e.g., human driver). In some instances, the connected vehicle 130 may be configured to switch selectively between an autonomous mode, one or more semi-autonomous operational modes, and/or a manual mode. Such switching can be implemented in a suitable manner, now known or later developed.

The vehicle 130 can include a sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such a case, the two or more sensors can form a sensor network. The sensor system 220 and/or the one or more sensors can be operatively connected to the processing unit(s) 210, the data store(s) 215, and/or another element of the vehicle 130 (including any of the elements shown in FIG. 2). The sensor system 220 can acquire data of at least a portion of the internal environment as well as the external environment of the vehicle 130 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the vehicle 130 itself. In one or more arrangements, the vehicle sensor(s) 221 can be configured to detect, and/or sense position and orientation changes of the vehicle 130, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 130. In one or more arrangements, the vehicle sensor(s) 221 can include a speedometer to determine a current speed of the vehicle 130.

Alternatively, or in addition, the sensor system 220 can include one or more environment sensors 222 configured to acquire, and/or sense data inside the vehicle as well as around the vehicle. Sensor data inside the vehicle can include information about one or more users in the vehicle cabin and any other objects of interest. Sensor data around the vehicle can include information about the external environment in which the vehicle is located or one or more portions thereof.

As an example, the one or more environment sensors 222 can be configured to detect, quantify and/or sense objects in at least a portion of the internal and/or the external environment of the vehicle 130 and/or information/data about such objects.

In the internal environment of the vehicle 130, the one or more environment sensors 222 can be configured to detect, measure, quantify, and/or sense human users inside the vehicle 130 and the facial expressions of the users. In the external environment, the one or more environment sensors 222 can be configured to detect, measure, quantify, and/or sense objects in the external environment of the vehicle 130, such as, for example, lane markers, signs, traffic lights, traffic signs, lane lines, crosswalks, curbs proximate the connected vehicle 130, off-road objects, electronic roadside devices, etc.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more embodiments, the sensor system 220 can include one or more radar sensors 223, one or more LIDAR sensors 224, one or more sonar sensors 225, one or more cameras 226, and/or one or more Global Navigation Satellite Systems 227. In one or more arrangements, the one or more cameras 226 can be high dynamic range (HDR) cameras or infrared (IR) cameras.

The connected vehicle 130 can include one or more vehicle systems 240. Various examples of the one or more vehicle systems 240 are shown in FIG. 2. However, the vehicle 130 can include more, fewer, or different vehicle systems 240. It should be appreciated that although particular vehicle systems are separately defined, each or any of the systems or portions thereof may be otherwise combined or segregated via hardware and/or software within the connected vehicle 130. The connected vehicle 130 can include a propulsion system 241, a braking system 242, a steering system 243, throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the vehicle 130 and/or to determine a travel route for the vehicle 130. The navigation system 247 can include one or more mapping applications to determine a travel route for the vehicle 130. The navigation system 247 can include a global positioning system, a local positioning system or a geolocation system.

The connected vehicle 130 can include one or more autonomous driving systems 260. The autonomous driving system 260 can include one or more devices, applications, and/or combinations thereof, now known or later developed, configured to control the movement, speed, maneuvering, heading, direction, etc. of the vehicle 130. The autonomous driving system 260 can include one or more driver assistance systems such as a lane keeping system, a lane centering system, a collision avoidance system, and/or a driver monitoring system.

The connected vehicle 130 may include one or more data stores 215 for storing one or more types of data. The data store(s) 215 may include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 215 may be a component of the processing unit(s) 210, or the data store(s) 215 may be operatively connected to the processing unit(s) 210 for use thereby. The term "operatively connected," as used throughout this description, can include direct or indirect connections, including connections without direct physical contact.

In one or more embodiments, the data store(s) 215 may include map data 216. The map data 216 can include maps of one or more geographic areas. The map data 216 can include measurements, dimensions, distances, and/or information for one or more items included in the map data 216 and/or relative to other items included in the map data 216. The map data 216 can include a digital map with information about road geometry. The map data 216 can be high quality and/or highly detailed.

The data store(s) 215 may include sensor data 219. In this context, "sensor data" means any information derived from the sensors that the connected vehicle 130 is equipped with. As will be explained below, the connected vehicle 130 can include the sensor system 220. The sensor data 219 may relate to one or more sensors of the sensor system 220. As an example, in one or more embodiments, the sensor data 219 can include information from one or more vehicle sensors 221 and/or environment sensors 222 of the sensor system 220.

In some instances, at least a portion of the map data 216 and/or the sensor data 219 can be located in one or more data stores 215 located onboard the vehicle 130. Alternatively, or in addition, at least a portion of the map data 216 and/or the sensor data 219 can be located in one or more data stores 215 that are located remotely from the vehicle 130.

The connected vehicle 130 may include one or more processing units 210. In one or more embodiments, the processing unit(s) 210 may be a main processor of the connected vehicle 130. For instance, the processing unit(s) 210 may be an electronic control unit (ECU). The processing unit(s) 210 may receive sensor data from the sensor system 220 and/or the data store(s) 215. The processing unit(s) may classify the sensor data based on one or more of the source of the sensor data, the applications and/or vehicle systems requiring the sensor data, and the urgency or priority associated with the sensor data. The processing unit(s) 210 may determine the data generation rate information related to the classified data based on the rate at which data is generated by the sensors, sent to the processing unit(s), classified by the processing unit(s), and sent to one or more communication unit(s).

The connected vehicle 130 may include the communication units 230. In one or more embodiments, the communication unit(s) 230 may include any suitable software and/or hardware for transmitting data and receiving data between the connected vehicle and the edge server. The communication unit(s) may communicate with the edge server over a communication network, such as by any type of vehicle-to-cloud (V2C) communications, now known or later developed. A "communication network" means one or more components designed to transmit and/or receive information from one source to another. The one or more communication networks may be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further may be implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network may include wired communication links and/or wireless communication links. The communication network may include any combination of the above networks and/or other types of networks.

Figure 3:
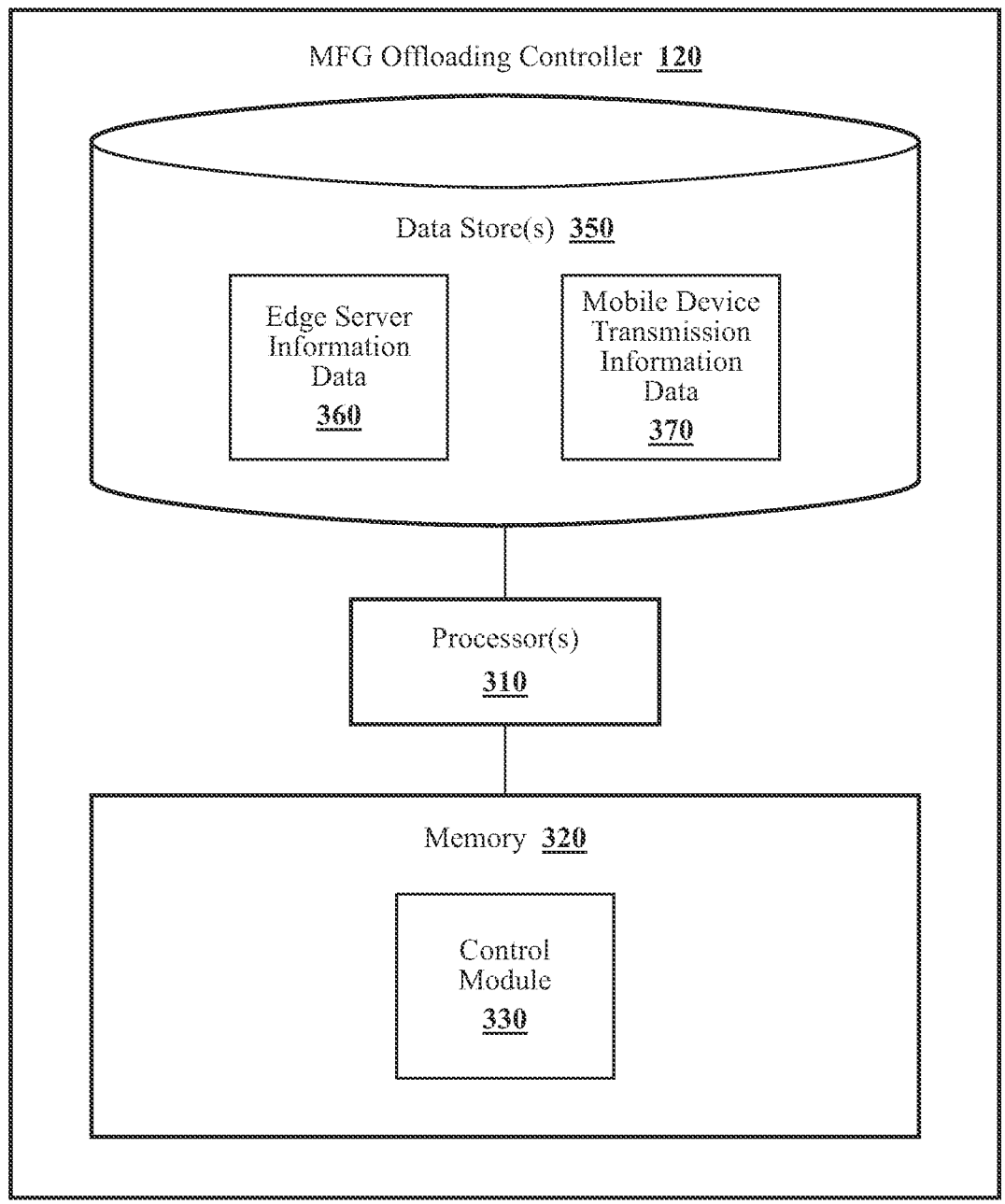
FIG. 3 illustrates one embodiment of a mean-field game controller.

With reference to FIG. 3, a more detailed block diagram of the MFG offloading controller 120 is shown. The MFG offloading controller 120 may include a processor(s) 310. Accordingly, the processor(s) 310 may be a part of the MFG offloading controller 120, or the processor(s) 310 may be external to the MFG offloading controller 120 such that the MFG offloading controller 120 may access the processor(s) 310 through a data bus or another communication pathway. In one or more embodiments, the processor(s) 310 is an application-specific integrated circuit that may be configured to implement functions associated with a control module 330. More generally, in one or more aspects, the processor(s) 310 is an electronic processor, such as a microprocessor that can perform various functions as described herein when loading the control module 330 and executing encoded functions associated therewith.

The MFG offloading controller 120 may include a memory 320 that stores the control module 330. The memory 320 may be a random-access memory (RAM), read-only memory (ROM), a hard disk drive, a flash memory, or other suitable memory for storing the control module 330. The control module 330 is, for example, a set of computer-readable instructions that, when executed by the processor(s) 310, cause the processor(s) 310 to perform the various functions disclosed herein. While, in one or more embodiments, the control module 330 is a set of instructions embodied in the memory 320, in further aspects, the control module 330 may include hardware, such as processing components (e.g., controllers), circuits, etc. for independently performing one or more of the noted functions.

The MFG offloading controller 120 may include a data store(s) 350 for storing one or more types of data. Accordingly, the data store(s) 350 may be a part of the MFG offloading controller 120, or the MFG offloading controller 120 may access the data store(s) 350 through a data bus or another communication pathway. The data store(s) 350 is, in one embodiment, an electronically based data structure for storing information. In at least one approach, the data store 350 is a database that is stored in the memory 320 or another suitable medium, and that is configured with routines that can be executed by the processor(s) 310 for analyzing stored data, providing stored data, organizing stored data, and so on. In either case, in one embodiment, the data store 350 stores data used by the control module 330 in executing various functions. In one embodiment, the data store 350 may be able to store edge server resource information data 360, mobile device transmission information data 370, and/or other information that is used by the control module 330.

The data store(s) 350 may include volatile and/or non-volatile memory. Examples of suitable data stores 350 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 350 may be a component of the processor(s) 310, or the data store(s) 350 may be operatively connected to the processor(s) 310 for use thereby. The term "operatively connected" or "in communication with" as used throughout this description, can include direct or indirect connections, including connections without direct physical contact.

In one or more arrangements, the data store(s) 350 can include edge server resource information data 360. The edge server resource information data 360 may include a bandwidth limitation of the edge server, a channel gain of the edge server, environment information, and/or a number of connected mobile devices.

In one or more arrangements, the data store(s) 350 can include mobile device transmission information data 370. The mobile device transmission information data 370 can include one or more characteristics of one or more mobile devices 130. The mobile device transmission information data 370 can include one or more transmission characteristics of the mobile device(s) 130 such as a data generation rate of the mobile device, a response time latency for the mobile device, and/or a mobile device speed.

In one embodiment, the control module 330 may include instructions that, when executed by the processor(s) 310, cause the processor(s) 310 to receive one or more mobile device transmission information. As previously mentioned, the mobile device transmission information may include the data generation rate of the mobile device 130, the response time latency of the mobile device, and the mobile device speed. The mobile device 130 may be any device that can be configured to connect and offload data to an edge server 110. As an example, the mobile device 130 may be a vehicle.

The control module 330 may further include instructions that, when executed by the processor(s) 310, cause the processor(s) 310 to receive a connection request from the mobile device 130 and output a connection confirmation. As an example, the control module 330 may receive a request signal from the mobile device 130 that is proximate to the MFG offloading controller 120 and/or the edge server 110. In other words, the control module 330 may receive the request signal from a mobile device 130 that is within the coverage area of the edge server 110. The request signal from the mobile device 130 may include a request to connect to the edge server 110. Upon receiving the request to connect, the control module 330 may output a confirmation signal to the mobile device 130, confirming that a connection between the mobile device 130 and the edge server 110 may be established. The control module 330 may receive the request signal from and output the confirmation signal to the mobile device 130 via one or more local base stations.

Upon establishing a connection between the MFG offloading controller 120 and the mobile device 130, the control module 330 may receive the mobile device transmission information from the mobile device 130. As an example, the control module 330 may output a signal to the mobile device 130, requesting the mobile device transmission information that may include the data generation rate, the response time latency, and/or the mobile device speed. In the case where the mobile device 130 responds, the control module may receive the mobile device transmission information from the mobile device.

In one embodiment, the control module 330 may include instructions that, when executed by the processor(s) 310, cause the processor(s) 310 to receive edge server resource information. As previously mentioned, the edge server resource information may include the bandwidth limitation of the edge server, the channel gain of the edge server, the environment around the edge server, and/or the number of connected mobile devices 130, connected to the edge server 110. As an example, the MFG offloading controller 120 may request the edge server resource information from the edge server 110. In response, the edge server 110 may send and the MFG offloading controller 120 may receive the edge server resource information.

In one embodiment, the control module 330 may include instructions that, when executed by the processor(s) 310, cause the processor(s) 310 to determine an offloading rate for the mobile device 130 to an edge server based on the mobile device transmission information, the edge server resource information, and a mean-field game algorithm. As an example, the control module 330 may apply a mean-field game algorithm based on a coupled system of highly non-linear partial differential equations, the Hamilton-Jacobi-Bellman equation and Fokker-Planck equation. As another example, the control module 330 may apply a mean-field game based on a probabilistic approach. The approach may be based on the solution of a forward-backward stochastic differential system of equations of McKean-Vlasov type. The optimization target of the control module 330 may be to minimize the averaged mobile devices' energy consumption, which may include transmission and the computation energy consumption. Additionally and/or alternatively, the optimization target of the control module 330 may be to minimize the end-to-end latency of mobile devices' tasks.

As an example of the control module 330 applying the mean-field game algorithm, after receiving the mobile devices' data generation rates, the control module 330 may normalize the data generation rates into a distribution. Then, the control module 330 may quantify the mobile devices' energy consumption into an integral based on a normalized distribution, the mobile device transmission information, and/or the edge server resource information. The control module 330 may utilize an algorithm such as a G-prox primal-dual hybrid gradient (PDHG) algorithm to solve the quantified MFG problem. The control module 330 may determine the optimized distribution of the mobile devices' data offloading rate, and may further un-normalize the optimized distribution to determine the offloading rate for the mobile device(s) 130.

The control module 330 may further include instructions that, when executed by the processor(s) 310, cause the processor(s) 310 to determine the offloading rate using the MFG offloading controller 120. In such a case, the processor(s) 310 may include the capability of multithreading, being capable of running multiple threads of execution concurrently. As an example, the control module 330 may determine the offloading rate for the requesting mobile devices 130 on a first in, first out basis. In such an example, the first mobile device 130 whose mobile device transmission information is received is assigned the first available thread, the second mobile device 130 is assigned the second available thread, and so on.

Additionally and/or alternatively, the control module further includes instructions that when executed by the processor cause the processor to group mobile devices that have similar mobile device transmission information and determine an offloading rate for the group of mobile devices to the edge server using a single thread in the multi-thread MFG offloading controller. As an example, the control module may receive the mobile device transmission information for two or more mobile devices. The control module may compare the data generation rates, the response time latencies, and the mobile device speeds of the mobile devices to determine whether the data generation rates of the mobile devices are close enough to each other, the response latencies of the mobile devices are close enough to each other, and the mobile devices are close enough to each other that the offloading rates of the mobile devices may be similar or close in value to each other. The control module may group the mobile devices that may have offloading rates that are similar or close in value to each other together. As an example, the control module may group a first set of mobile devices and determine the offloading rate for the first set in a first thread, and may group a second set of mobile devices and determine the offloading rate for the second set in a second thread. As an example, the control module may apply the mean field games algorithm to a mean value of the data generation rates, the response time latencies, and the mobile device speeds. As another example, the control module may apply the mean field games algorithm to a median value of the data generation rates, the response time latencies, and the mobile device speeds.

In one embodiment, the control module 330 may include instructions that, when executed by the processor(s) 310, cause the processor(s) 310 to output the offloading rate to the mobile device 130. As an example, upon determining the offloading rate for the mobile device 130, the control module 330 may send the offloading rate to the mobile device 130.

Figure 4:
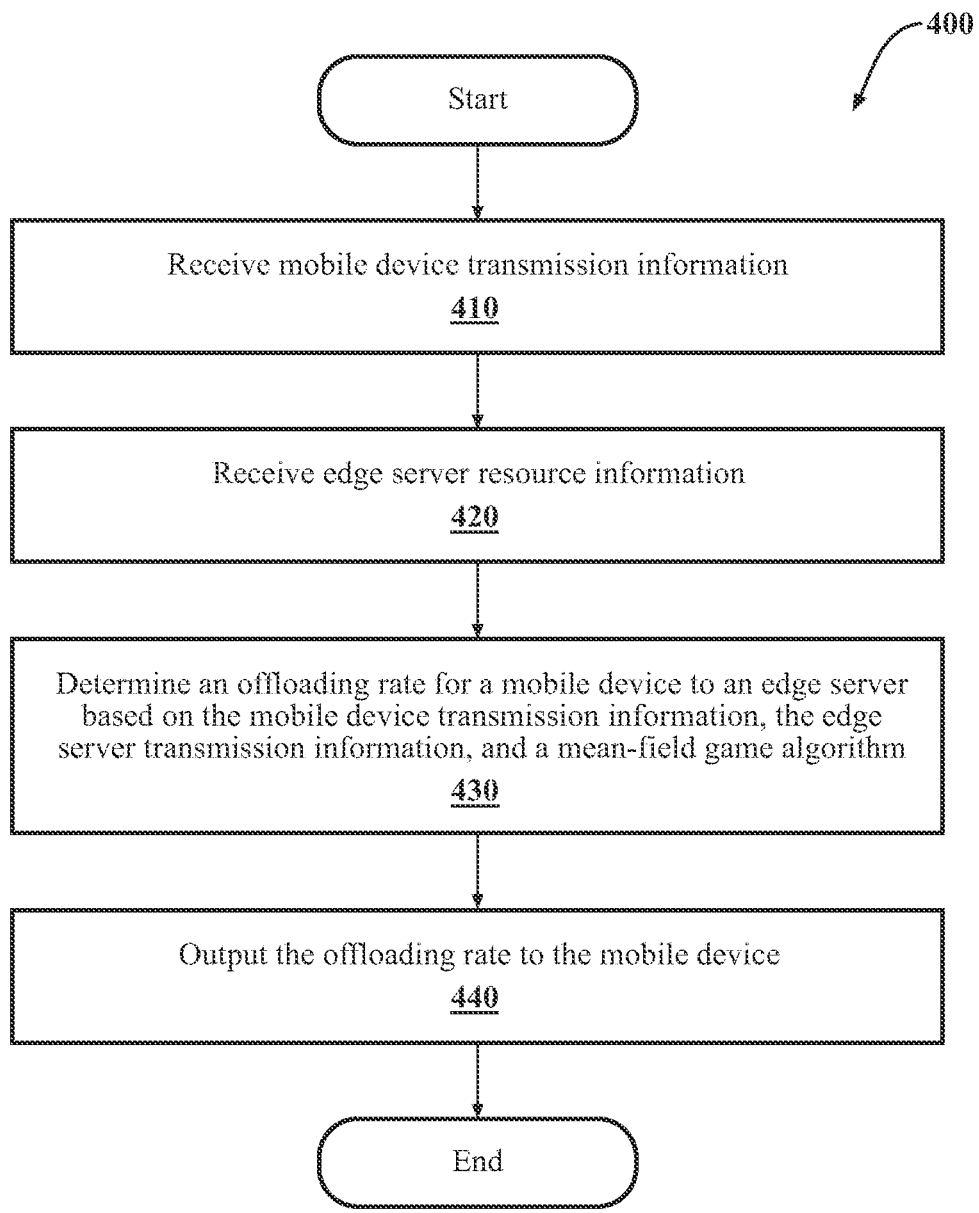
FIG. 4 is a flowchart illustrating one embodiment of a method associated with determining the optimal offloading rate for mobile devices.

FIG. 4 illustrates a method 400 for determining an optimal data offloading rate for one or more connected mobile devices 130. The method 400 will be described from the viewpoint of the data offloading system 100 of FIG. 1 and the MFG offloading controller 120 of FIG. 3. However, the method 400 may be adapted to be executed in any one of several different situations and not necessarily by the data offloading system 100 of FIG. 1 and/or the MFG offloading controller 120 of FIG. 3.

At step 410, the control module 330 may cause the processor(s) 310 to receive mobile device transmission information. As previously mentioned, the control module 330 may receive a request to connect from a mobile device 130 such as a vehicle. The control module 330 may send a response confirming that a connection has been established. The control module 330 may then receive mobile device transmission information such as data generation rate, response time latency, and mobile device speed.

At step 420, the control module 330 may cause the processor(s) 310 to receive edge server resource information. As previously mentioned, the control module 330 may request edge server resource information from the edge server 110 and/or a base station. In response to the request, the control module 330 may receive the edge server resource information from the edge server 110 and/or the base station. The edge server resource information data 360 may include a bandwidth limitation of the edge server 110, a channel gain of the edge server 110, environment information, and/or a number of connected mobile devices 130.

At step 430, the control module 330 may cause the processor(s) 310 to determine an offloading rate for the mobile device 130 to the edge server 110 based on the mobile device transmission information, the edge server resource information, and a mean-field game algorithm. As previously mentioned, the control module 330 may apply any suitable mean-field game algorithm to the mobile device transmission information and the edge server resource information to determine the offloading rate for the mobile device 130. As an example, the control module 330 may determine the offloading rate for the requesting mobile devices 130 in an individual manner. In such an example, the control module 330 may apply the mean field game algorithm to the mobile device transmission information of a single mobile device 130 and the edge server resource information to determine the offloading rate for the single mobile device 130. As another example, the control module 330 may determine the offloading rate for the requesting mobile devices 130 in a group manner. In such an example and as previously mentioned, the control module 330 may group together mobile devices 130 that may have similar or close data generation rates, response time latencies, and/or mobile device speeds.

At step 440, the control module 330 may cause the processor(s) 310 to output the offloading rate to the mobile device 130. As previously mentioned, the control module 330 may output the determined offloading rate to the mobile device 130.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising the steps of:
receiving mobile device transmission information;
receiving edge server resource information;
determining an offloading rate for a mobile device to an edge server based on the mobile device transmission information, the edge server resource information, a speed of travel of the mobile device, and a mean-field game algorithm; and
outputting the offloading rate to the mobile device.

2. The method of claim 1, wherein the mobile device is a vehicle.

3. The method of claim 1, wherein the mobile device transmission information is one of a data generation rate, a response time latency, and a mobile device speed.

4. The method of claim 1, wherein the edge server resource information is one of a bandwidth limitation, a channel gain, environment information, and a number of connected mobile devices.

5. The method of claim 1, further comprising:
receiving a connection request from a mobile device, and
outputting a connection confirmation.

6. The method of claim 1, wherein determining the offloading rate further comprises: determining the offloading rate using a multi-thread mean field game (MFG) offloading controller.

7. The method of claim 6, wherein determining the offloading rate further comprises:
grouping mobile devices that have similar mobile device transmission information; and determining an offloading rate for a group of mobile devices to the edge server using a single thread in the multi-thread MFG offloading controller.

8. A system comprising:
a processor; and
a memory in communication with the processor, the memory including:
  a control module having instructions that, when executed by the processor, cause the processor to:
  receive a mobile device transmission information,
  receive an edge server resource information,
  determine an offloading rate for a mobile device to an edge server based on the mobile device transmission information, the edge server resource information, a speed of travel of the mobile device, and a mean-field game algorithm, and
  output the offloading rate to the mobile device.

9. The system of claim 8, wherein the mobile device is a vehicle.

10. The system of claim 8, wherein the mobile device transmission information is one of a data generation rate, a response time latency, and a mobile device speed.

11. The system of claim 8, wherein the edge server resource information is one of a bandwidth limitation, a channel gain, environment information, and a number of connected mobile devices.

12. The system of claim 8, wherein the control module further includes instructions that when executed by the processor cause the processor to:
receive a connection request from a mobile device, and
output a connection confirmation.

13. The system of claim 8, wherein the control module further includes instructions that when executed by the processor cause the processor to determine the offloading rate using a multi-thread mean field game (MFG) offloading controller.

14. The system of claim 13, wherein the control module further includes instructions that when executed by the processor cause the processor to:
group mobile devices that have similar mobile device transmission information; and
determine an offloading rate for a group of mobile devices to the edge server using a single thread in the multi-thread MFG offloading controller.

15. A non-transitory computer-readable medium including instructions that when executed by a processor cause the processor to:
receive a mobile device transmission information,
receive an edge server resource information,
determine an offloading rate for a mobile device to an edge server based on the mobile device transmission information, the edge server resource information, a speed of travel of the mobile device, and a mean-field game algorithm, and
output the offloading rate to the mobile device.

16. The non-transitory computer-readable medium of claim 15, wherein the mobile device is a vehicle.

17. The non-transitory computer-readable medium of claim 15, wherein the mobile device transmission information is one of a data generation rate, a response time latency, and a mobile device speed.

18. The non-transitory computer-readable medium of claim 15, wherein the edge server resource information is one of a bandwidth limitation, a channel gain, environment information, and a number of connected mobile devices.

19. The non-transitory computer-readable medium of claim 15, wherein the instructions further include instructions that when executed by the processor cause the processor to:
receive a connection request from a mobile device, and
output a connection confirmation.

20. The non-transitory computer-readable medium of claim 15, wherein the instructions further include instructions that when executed by the processor cause the processor to determine the offloading rate using a multi-thread mean field game (MFG) offloading controller.

* * * * *